UNITED STATES PATENT OFFICE.

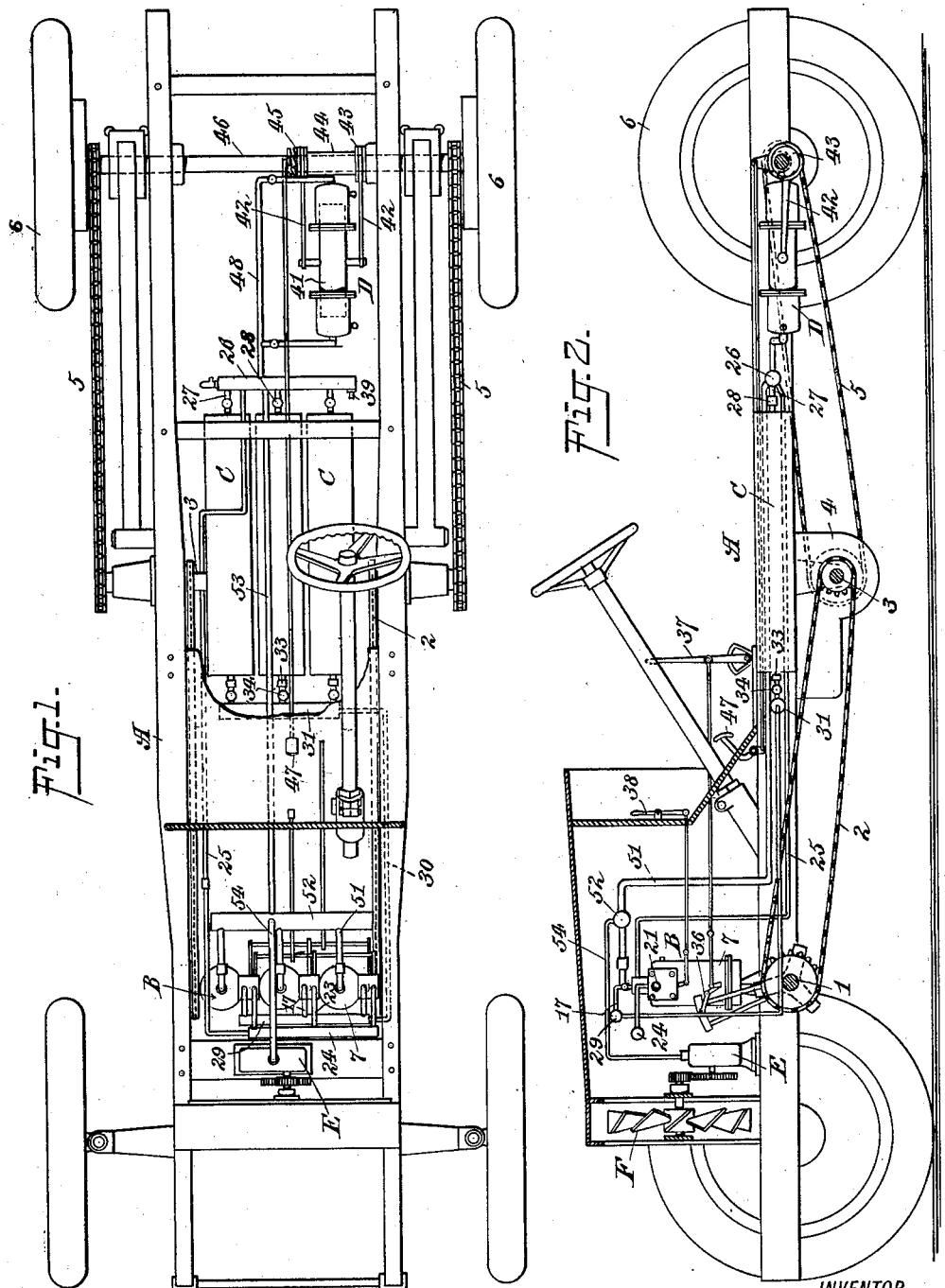

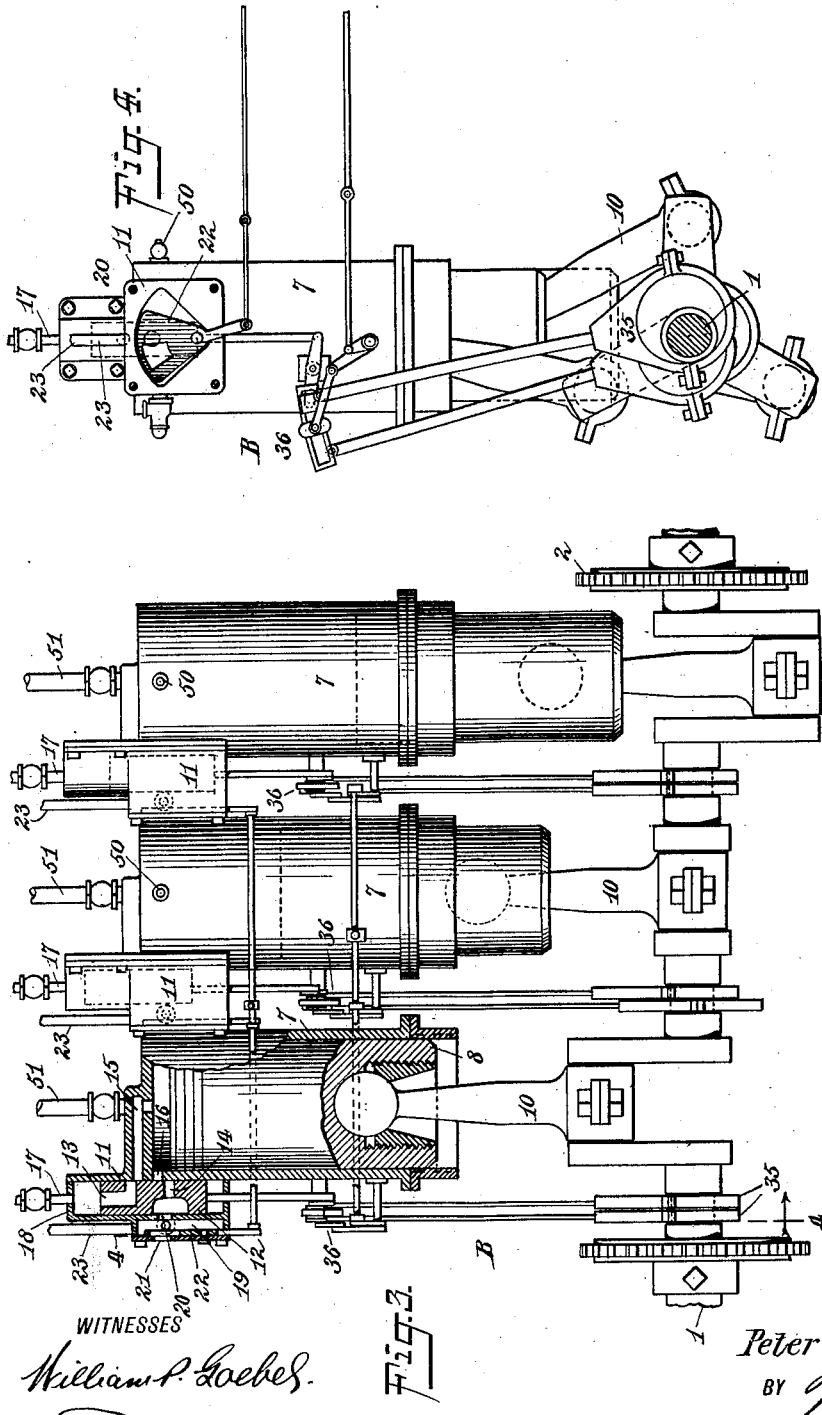

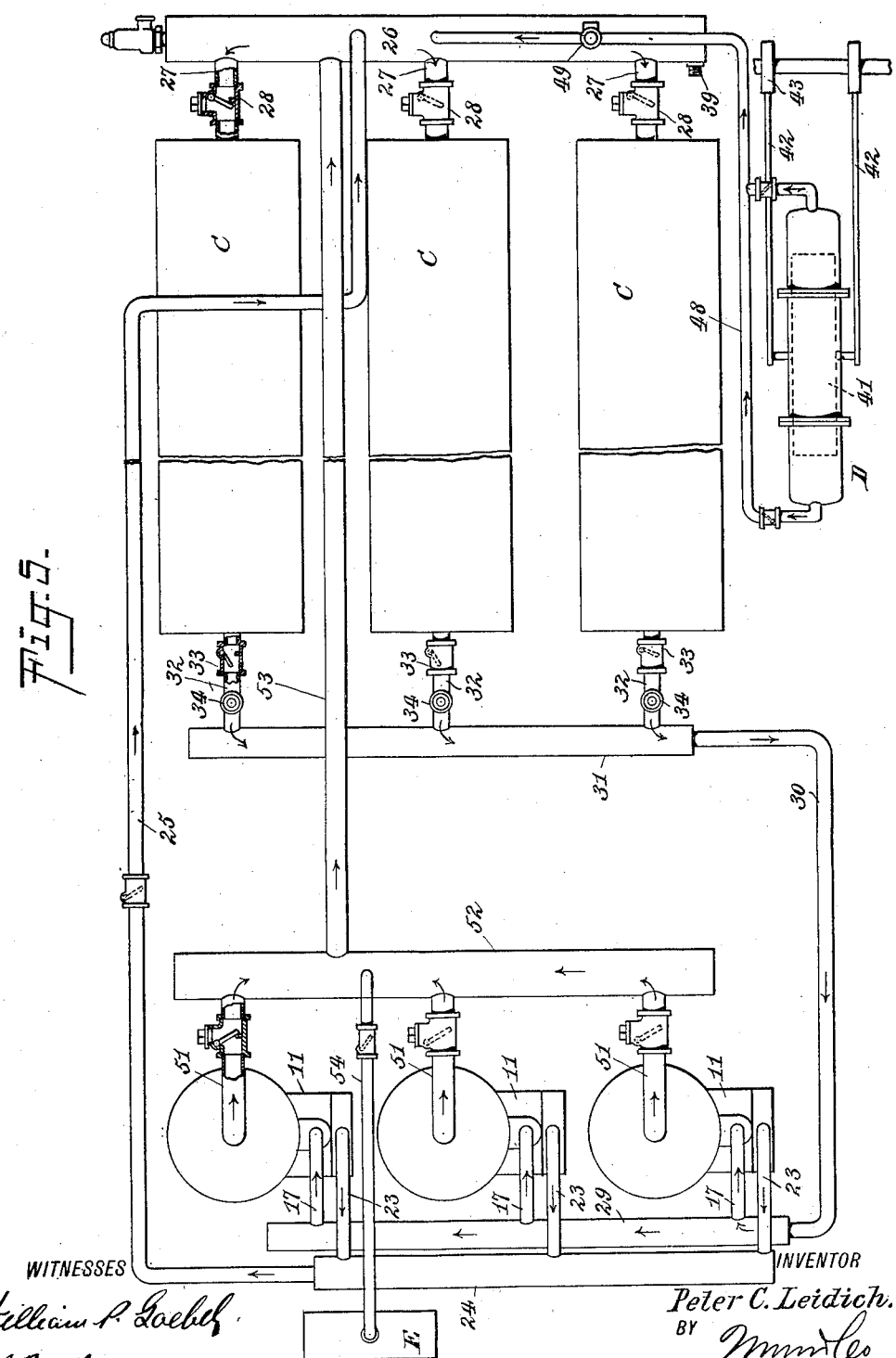

PETER C. LEIDICH, OF PHILADELPHIA, PENNSYLVANIA, ASSIGNOR OF ONE THIRTY-NINTH TO CHRISTIAN ERNST LEIDICH, OF PHILADELPHIA, HOLMESBURG, PENNSYLVANIA.

POWER PLANT FOR VEHICLES.

1,360,122.

Specification of Letters Patent.   Patented Nov. 23, 1920.

Application filed August 24, 1918. Serial No. 251,335.

*To all whom it may concern:*

Be it known that I, PETER C. LEIDICH, a citizen of the United States, and a resident of Philadelphia, Frankford, in the county of Philadelphia and State of Pennsylvania, have invented a new and Improved Power Plant for Vehicles, of which the following is a full, clear, and exact description.

This invention relates to power plants especially adapted for but not necessarily limited to use in connection with automobiles, and the invention has for its general objects to provide a power unit in which compressed air is employed as the motive fluid, the unit being so designed that the storage tank or tanks can be charged from an external source or from one or more pumps installed on the automobile, or from the engine operating as a pump, or by diverting the exhaust from the engine to a tank of relatively lower pressure than the tank for the time being supplying the engine with compressed air, these results being accomplished by a novel arrangement of piping and valves and by a novel form of engine.

For a more complete understanding of the invention reference is to be had to the following description and claims taken in connection with the accompanying drawings which illustrate one embodiment of the invention and wherein similar characters of reference indicate corresponding parts in all the views.

Figure 1 is a plan view of a power plant as embodied in an automobile;

Fig. 2 is a longitudinal section;

Fig. 3 is an enlarged front view of the engine with one of the cylinders in section;

Fig. 4 is a side view of the engine; and

Fig. 5 is a diagrammatic view of the tanks, engine, pumps and connections.

Referring to the drawings, A designates an automobile chassis of any approved type which carries an engine or motor B, a plurality of compressed air tanks C, an air compressor D driven from the rear axle, and another compressor E driven from a windwheel F at the front of the vehicle. The shaft 1 of the engine is connected by sprocket chain devices 2 with a secondary shaft 3 which has a differential gearing (not shown) in the gear box 4, the secondary shaft being connected by sprocket and chain devices 5 with the rear wheels 6.

The engine B is composed of a plurality of cylinders 7 in each of which reciprocates a piston 8 connected with the crank shaft 1 by a connecting rod 10, each cylinder having a valve chest 11 in which is a slide valve 12 formed with inlet and exhaust passages 13 and 14 that are adapted to register with inlet and exhaust ports 15 and 16 at the head of the cylinder. A compressed air supply pipe 17 connects with the chamber 18 of the valve chest to supply compressed air to the cylinder for operating on the piston. The air on the in-stroke is forced out through the exhaust port 16 when the port 14 in the valve registers therewith. The valve chest has an exhaust chamber 19 that communicates with the exhaust port 14 of the valve through an opening 20, and the wall of the chamber 19 has an outlet port 21 which opens to the atmosphere. A valve 22 controls the outlet port 21, so that all the air can be discharged directly to the atmosphere during the stroke of the piston 8, or the air can be wholly or partially by-passed to a compressed air tank C, provided the latter is at a pressure lower than the pressure of exhaust of the engine. This by-pass is effected through a pipe 23 that connects with a header 24 that is in turn connected by a pipe 25 with the compressed air supply header 26 for the tanks, the header 26 being connected by branches 27 with the tanks C, and in each branch is a check valve 28. The inlet pipes 17 are connected with a header 29 which is connected by a pipe 30 with a header 31 which has branches 32 leading to the tanks C, and in these branches are check valves 33 opening toward the engine, and a hand-controlled valve 34. By means of these valves 34 any one or more tanks can be employed to supply compressed air to the motor or engine. When the pressure in one tank falls below a certain point another tank can be opened to supply the air. The slide valve for each cylinder is actuated by eccentric gears 35 operating through a link motion 36, all the link motions being controlled by a lever 37. The exhaust controlling valves 19 are all controlled by a single lever 38.

The tanks C may be supplied with compressed air from a source of supply external to the power plant, and for this purpose the header or manifold 26 has a nipple 39 for connection with a hose. However, it is possible to utilize the momentum of the car, especially in going down hill, for supplying air. For this purpose an air pump or compressor D is mounted on the rear of the car, and the piston 41 thereof is connected by rods 42 with eccentrics 43 on a sleeve 44 that is adapted to be connected by a clutch 45 with the rear axle 46, the clutch 45 being controlled by a pedal 47 operable from the driver's seat. The pump D is connected by a pipe 48 with the header 26, there being a relief valve 49 in the pipe 48. The engine B may be used as a compressor, especially going down hill, for supplying air to the tanks. For this purpose each cylinder has an inlet port 50 and valved outlets 51 which are branches of a header or manifold 52 that is connected by a pipe 53 with the supply header 26. When the engine is used as a compressor the slide valve of each cylinder will be so adjusted as to close the inlet and outlet ports 15 and 16.

The compressor E, which is geared to the windwheel F to be driven thereby by wind pressure when the car is operating, is connected by a pipe 54 with the header 52 that is connected with the tanks C, as before explained, whereby air may be supplied to the tanks.

In going down a steep hill the engine may be used as a brake by moving the reversing lever toward the center from the forward position, and it may also act as an emergency brake by pulling the reversing lever back to or over the center position of the lever. Furthermore, the engine may run backward by pulling the reversing lever in the opposite direction from that necessary for forward propulsion, and consequently cog wheels, clutches or the like are dispensed with.

From the foregoing description taken in connection with the accompanying drawings, the advantages of the construction and method of operation will be readily understood by those skilled in the art to which the invention appertains, and while I have described the principle of operation, together with the mechanism which I now consider to be the best embodiment thereof, I desire to have it understood that the mechanism shown is merely illustrative and that such changes may be made when desired as fall within the scope of the appended claims.

Having thus described my invention, I claim as new and desire to secure by Letters Patent:

1. A power unit for automobiles or the like comprising a compressed air motor including one or more cylinders and pistons operating therein, a plurality of storage tanks, a header having valved connections with each tank, a plurality of air compressors having communication with said header for supplying air to the tanks under pressure, auxiliary means for supplying air under pressure to the tanks through said header, a second header having valved communication with each tank and having connection with each of said cylinders, and a valve mechanism associated with each cylinder for controlling the supply and exhaust of compressed air therefrom.

2. A power unit for automobiles or the like, comprising a compressed air motor including one or more cylinders and pistons operating therein, a plurality of storage tanks, a header having valved connections with each tank, a plurality of air compressors having communication with said header for supplying air to the tanks under pressure, auxiliary means for supplying air under pressure to the tanks through said header, a second header having valved communication with each tank and having connection with each of said cylinders, a valve mechanism associated with each cylinder for controlling the supply and exhaust of compressed air therefrom, a third header having independent connection with each cylinder, a conduit connecting the last two named headers, said valved connections between the tanks and the second named header including each a check valve opening toward the second-named header and a manually operated valve permitting independent or simultaneous use of the tanks, driving connections associated with said motor, reversing means associated with said motor, and a valve mechanism associated with each cylinder and controlled by said reversing means, said valve mechanism controlling the supply and exhaust to the cylinders.

3. A power unit for automobiles or the like, comprising a compressed air motor including one or more cylinders and pistons operating therein, a plurality of storage tanks, a header having valved connections with each tank, a plurality of air compressors having communication with said header for supplying air to the tanks under pressure, auxiliary means for supplying air under pressure to the tanks through said header, a second header having valved communication with each tank and having connection with each of said cylinders, a valve mechanism associated with each cylinder for controlling the supply and exhaust of compressed air therefrom, a third header having independent connection with each cylinder, a conduit connecting the last two named headers, said valved connections between the tanks and the second named header including each a check valve opening toward the second named header, and a manually operated valve permitting independent or simultaneous use of the tanks, driving connections associated with said motor, reversing means associated with said motor, valved connections for controlling the supply of compressed air to the cylinders, said valve mechanisms each comprising means for discharging the exhausted air directly to the atmosphere or to the tanks when the pressure in the latter is below that of the exhausted air, and means for manually controlling said compressors.

4. In a motor, a cylinder having main inlet and outlet ports and auxiliary inlet and outlet ports, a piston in the cylinder, a plurality of tanks, a valve chest, a connection between the tanks and valve chest, a connection between the auxiliary outlet of the cylinder and the air tanks, and a valve in the valve chest for controlling the main inlet and outlet ports of the cylinder, said valve being adapted to close the said main inlet and outlet ports.

5. In a motor, a cylinder having inlet and exhaust ports, a piston in the cylinder, a valve chest, a valve in the valve chest for controlling the inlet and exhaust ports, a plurality of air tanks, a pump, means for operating the pump, a connection between the pump and air tanks, and a connection between the air tanks and valve chest.

6. In a power plant, a plurality of air tanks, a motor having an exhaust chamber, a connection between the motor and tanks for admitting air from one tank to the motor, a valve device for controlling the admission of air to the motor and the exhaust air to the said chamber, means for operating the valve device to close the inlet and exhaust ports of the motor, a connection between the exhaust chamber of the motor and the air tanks for delivering the exhaust of the motor into another tank, and a valve device for controlling the outlet port of the said exhaust chamber.

7. In a power plant, a plurality of air tanks, a cylinder having inlet and exhaust ports, a piston in the cylinder, a valve chest, an exhaust chamber opening into the valve chest and having an outlet port, a connection between the valve chest and the air tanks for admitting air from one tank to the valve chest, a slide valve in the said chest and controlling the inlet and exhaust ports, means for operating the valve to close both the inlet and exhaust ports, a connection between the exhaust chamber and the air tanks for delivering the exhaust from said chamber to another tank, and a valve for wholly or partially closing the outlet of the exhaust chamber.

8. In a power plant for vehicles, an air tank, a cylinder having inlet and exhaust ports, a piston in the cylinder, a connection between the cylinder and air tank, a valve device for controlling the admission of air to and exhaust of air from the cylinder, said cylinder having an additional inlet port and valved outlet, means for operating the valve device to close the main inlet and exhaust ports, a pump, means for operating the pump from an axle of the vehicle, and a connection between the pump and air tank.

9. In a power plant for motor vehicles, a motor comprising one or more cylinders, pistons operating therein, each cylinder having a port in the head and in the side portion thereof adjacent to the head, a valve chest associated with each cylinder and communicating through a lateral port with the port in the head of the cylinder and through said port in the side of the cylinder, a sliding valve operable in each chest and formed with independent inlet and exhaust passages adapted to register independently with the inlet and exhaust ports of the cylinders, means for operating said valve, reversing means for said actuating means, and means for supplying air under pressure to the cylinders.

10. In a power plant for motor vehicles, a motor comprising one or more cylinders, pistons operating therein, each cylinder having a port in the head and in the side portion thereof adjacent to the head, a valve chest associated with each cylinder and communicating through a lateral port with the port in the head of the cylinder and through said port in the side of the cylinder, a sliding valve operable in each chest and formed with independent inlet and exhaust passages adapted to register independently with the inlet and exhaust ports of the cylinders, means for operating said valve, reversing means for said actuating means, a storage reservoir for air, means operated by the advance of the vehicle for supplying air under pressure to said reservoir, valve means for controlling the supply of compressed air to the cylinders through the head ports thereof, an exhaust chamber associated with each valve chest, valve connections between the cylinders and the reservoir for exhausting the air therefrom to said reservoir at times, a valve actuated by said sliding valve mechanism and controllable to directly exhaust said air to the atmosphere or to the reservoir, and means to permit the use of said motor as a compressor for supplying air to the reservoir under pressure.

PETER C. LEIDICH.